(12) United States Patent
Pedone

(10) Patent No.: US 12,557,800 B1
(45) Date of Patent: *Feb. 24, 2026

(54) WEEDLESS LURES, HOOKS, AND CASTING LURES

(71) Applicant: Michele A Pedone, Centereach, NY (US)

(72) Inventor: Michele A Pedone, Centereach, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/091,077

(22) Filed: Mar. 26, 2025

Related U.S. Application Data

(63) Continuation-in-part of application No. 18/469,200, filed on Sep. 18, 2023, now Pat. No. 12,279,603.

(60) Provisional application No. 63/408,934, filed on Sep. 22, 2022.

(51) Int. Cl.
A01K 85/00 (2006.01)

(52) U.S. Cl.
CPC ................................ A01K 85/1821 (2022.02)

(58) Field of Classification Search
CPC .... A01K 85/02; A01K 85/021; A01K 85/022; A01K 85/023; A01K 85/024; A01K 85/025; A01K 85/14; A01K 85/18; A01K 85/1811; A01K 85/1821; A01K 85/1837; A01K 85/1871; A01K 85/1881; A01K 85/1891; A01K 83/066; A01K 83/069; A01K 83/06; A01K 83/064; A01K 83/00
USPC ....... 43/43, 42.15, 42.11, 42.1, 42.18, 42.39, 43/42.5, 42.24, 42.28, 42.4, 42.41, 42.42, 43/42.43, 43.2, 43.6, 44.2, 44.8, 43.16
See application file for complete search history.

(56) References Cited

U.S. PATENT DOCUMENTS

| | | | | |
|---|---|---|---|---|
| 994,927 | A * | 6/1911 | Jefferson | A01K 85/02 |
| | | | | 43/42.3 |
| 1,505,235 | A * | 8/1924 | Archer | A01K 83/06 |
| | | | | 43/42.42 |
| 1,539,365 | A * | 5/1925 | Masoner | A01K 85/16 |
| | | | | 43/42.15 |
| 1,645,874 | A * | 10/1927 | Sanford | A01K 95/00 |
| | | | | 43/43.13 |
| 1,846,130 | A * | 2/1932 | Martin | A01K 85/14 |
| | | | | 43/42.34 |
| 1,910,742 | A * | 5/1933 | Binns | A01K 85/14 |
| | | | | 43/42.28 |
| 1,913,282 | A * | 6/1933 | Major | A01K 85/00 |
| | | | | 43/42.48 |
| 1,999,416 | A * | 4/1935 | Loving | A01K 85/08 |
| | | | | 43/42.35 |
| 2,148,784 | A * | 2/1939 | Stewart | A01K 85/16 |
| | | | | 43/42.35 |

(Continued)

*Primary Examiner* — Timothy D Collins
*Assistant Examiner* — Maria E Graber
(74) *Attorney, Agent, or Firm* — Betsy Kingsbury Dowd; BKDowd Law, P.C.

(57) ABSTRACT

A weedless lure body has a hollow elliptical cone shape, with an opening in an elliptical shape. The body further includes a first side wall and a second side wall extending downward from a top of the hollow elliptical cone. A shank of a hook is formed with grabbing barbs, which are embedded in the second side wall. The barbed end is fixed relative to the second side wall, transversely within the opening, and vertically below the open end of the weedless lure body in use. The weedless lure body collapses upon itself in use for retrieval, with a fish on the hook.

12 Claims, 9 Drawing Sheets

(56)                    References Cited

U.S. PATENT DOCUMENTS

| | | | | |
|---|---|---|---|---|
| 2,218,259 A * | 10/1940 | Finucan | A01K 85/14 | |
| | | | 43/42.28 | |
| 2,241,367 A * | 5/1941 | Sarff | A01K 85/02 | |
| | | | 43/43.15 | |
| 2,278,876 A * | 4/1942 | Hart | A01K 85/08 | |
| | | | 43/42.34 | |
| 2,332,400 A * | 10/1943 | Richardson | A01K 85/02 | |
| | | | 43/42.43 | |
| 2,518,593 A * | 8/1950 | Bell | A01K 83/06 | |
| | | | 43/44.2 | |
| 2,557,577 A * | 6/1951 | Soma | A01K 83/06 | |
| | | | 43/41 | |
| 2,763,086 A * | 9/1956 | Johnson | A01K 83/06 | |
| | | | 43/44.2 | |
| 2,811,804 A * | 11/1957 | Heath | A01K 83/00 | |
| | | | 206/315.11 | |
| 2,817,180 A * | 12/1957 | Thomas | A01K 85/16 | |
| | | | 43/42.23 | |
| 2,846,805 A * | 8/1958 | Waitzman | A01K 85/16 | |
| | | | D22/126 | |
| 2,986,837 A * | 6/1961 | Spugios | A01K 85/16 | |
| | | | 43/42.49 | |
| 3,269,050 A * | 8/1966 | Garwood | A01K 85/00 | |
| | | | D22/128 | |
| 3,495,350 A * | 2/1970 | Lievense | A01K 85/08 | |
| | | | 43/42.28 | |
| 3,605,318 A * | 9/1971 | Santo et al. | A01K 83/00 | |
| | | | 43/43.4 | |
| 3,680,249 A * | 8/1972 | Chiarenza | A01K 85/00 | |
| | | | 43/43.13 | |
| 3,751,842 A * | 8/1973 | Smith | A01K 85/16 | |
| | | | 43/42.11 | |
| 3,757,451 A * | 9/1973 | Cottle | A01K 85/16 | |
| | | | 43/42.4 | |
| 3,765,117 A * | 10/1973 | Gibson, Sr. | A01K 83/00 | |
| | | | 43/43.4 | |
| 3,768,195 A * | 10/1973 | Proietti | A01K 85/00 | |
| | | | 43/43.16 | |
| 3,908,298 A * | 9/1975 | Strader | A01K 85/02 | |
| | | | 43/42.31 | |
| 3,914,895 A * | 10/1975 | Mize | A01K 85/00 | |
| | | | 43/42.4 | |
| 3,982,349 A * | 9/1976 | Hills | A01K 85/16 | |
| | | | 43/42.39 | |
| 4,068,400 A * | 1/1978 | McCoy | A01K 97/18 | |
| | | | 43/53.5 | |
| 4,102,075 A * | 7/1978 | Wagner | A01K 85/01 | |
| | | | 43/42.31 | |
| 4,231,179 A * | 11/1980 | Hillesland | A01K 85/18 | |
| | | | D22/127 | |
| 4,253,263 A * | 3/1981 | Franklin | A01K 85/00 | |
| | | | 43/42.32 | |
| 4,266,360 A * | 5/1981 | Smith | A01K 85/16 | |
| | | | 43/42.48 | |
| 4,674,225 A * | 6/1987 | Webb | A01K 83/00 | |
| | | | 43/43.4 | |
| 4,703,579 A * | 11/1987 | Kay | A01K 85/10 | |
| | | | 43/42.24 | |
| 4,747,228 A * | 5/1988 | Giovengo, Jr. | A01K 85/01 | |
| | | | 43/42.42 | |
| D296,123 S * | 6/1988 | Davis | D22/126 | |
| 4,817,325 A * | 4/1989 | Thomas | A01K 85/02 | |
| | | | 43/42.24 | |
| 4,858,371 A * | 8/1989 | Preiser | A01K 83/00 | |
| | | | 43/43.16 | |
| 4,870,776 A * | 10/1989 | Schock | A01K 85/16 | |
| | | | 43/42.47 | |
| 4,881,340 A * | 11/1989 | Davis | A01K 85/16 | |
| | | | 43/42.23 | |
| 4,914,851 A * | 4/1990 | Acker | A01K 85/02 | |
| | | | 43/42.1 | |
| 4,936,041 A * | 6/1990 | Couture | A01K 85/14 | |
| | | | D22/129 | |
| 5,031,350 A * | 7/1991 | Rabideau | A01K 85/02 | |
| | | | 43/43.4 | |
| 5,097,620 A * | 3/1992 | Nietupski | A01K 85/01 | |
| | | | 43/44.99 | |
| 5,201,784 A * | 4/1993 | McWilliams | A01K 85/01 | |
| | | | 43/42.31 | |
| 5,299,378 A * | 4/1994 | Ballard | A01K 85/00 | |
| | | | 43/42.15 | |
| 5,319,876 A * | 6/1994 | Vlahek | A01K 83/06 | |
| | | | 43/43.4 | |
| 5,535,540 A * | 7/1996 | Crumrine | A01K 85/00 | |
| | | | 43/42.39 | |
| 5,806,234 A * | 9/1998 | Nichols | A01K 85/00 | |
| | | | 43/42.39 | |
| D410,063 S * | 5/1999 | Farina | D22/134 | |
| 5,950,350 A * | 9/1999 | Norton | A01K 85/02 | |
| | | | 43/42.42 | |
| 6,041,538 A * | 3/2000 | Roemer | A01K 85/00 | |
| | | | 43/42.4 | |
| 6,061,948 A * | 5/2000 | Boucek | A01K 85/00 | |
| | | | 43/42.39 | |
| 6,115,956 A * | 9/2000 | Firmin | A01K 85/00 | |
| | | | 43/42.24 | |
| 6,122,856 A * | 9/2000 | Hnizdor | A01K 85/08 | |
| | | | 43/42.28 | |
| 6,202,338 B1 * | 3/2001 | Carr | A01K 85/14 | |
| | | | 43/42.34 | |
| 6,519,894 B1 * | 2/2003 | Geary | A01K 85/02 | |
| | | | 43/41.2 | |
| 6,598,336 B2 * | 7/2003 | Link | A01K 85/00 | |
| | | | 43/42.38 | |
| 6,675,525 B1 * | 1/2004 | Ford | A01K 85/01 | |
| | | | 43/42.35 | |
| 6,763,631 B1 * | 7/2004 | Santini | A01K 85/00 | |
| | | | 43/42.39 | |
| 6,796,080 B1 * | 9/2004 | Mathews, Jr. | A01K 85/00 | |
| | | | 43/42.11 | |
| 6,813,856 B1 * | 11/2004 | Sitkewicz | A01K 85/00 | |
| | | | 43/42.15 | |
| 6,922,938 B1 * | 8/2005 | Ciuffo | A01K 85/00 | |
| | | | 43/42.15 | |
| 7,036,264 B2 * | 5/2006 | Barbary | A01K 85/00 | |
| | | | 43/42.35 | |
| 7,059,080 B2 * | 6/2006 | Bendel | A01K 85/16 | |
| | | | 43/42.49 | |
| 7,076,911 B2 * | 7/2006 | Thorne | A01K 85/00 | |
| | | | 43/42.26 | |
| 7,263,798 B2 * | 9/2007 | Nichols | A01K 85/18 | |
| | | | 43/42.26 | |
| 7,383,659 B1 * | 6/2008 | Honkanen | A01K 85/01 | |
| | | | 43/42.31 | |
| 7,469,497 B2 * | 12/2008 | Hergott | A01K 85/02 | |
| | | | 43/42.43 | |
| 7,716,870 B2 * | 5/2010 | Ukita | A01K 85/12 | |
| | | | 43/42.15 | |
| 7,845,107 B1 * | 12/2010 | Mell | A01K 85/00 | |
| | | | 43/42 | |
| 8,079,173 B2 * | 12/2011 | Corbitt, III | A01K 85/00 | |
| | | | 43/42.31 | |
| 8,381,429 B2 * | 2/2013 | Greene | A01K 85/00 | |
| | | | 43/42.28 | |
| 8,402,687 B1 * | 3/2013 | Jarrell | A01K 85/00 | |
| | | | 43/42.28 | |
| 8,739,460 B2 * | 6/2014 | Thorne | A01K 85/14 | |
| | | | 43/42.15 | |
| 8,745,916 B1 * | 6/2014 | Rutty | A01K 85/01 | |
| | | | 43/42.35 | |
| 9,565,842 B1 * | 2/2017 | Winter | A01K 83/00 | |
| 10,806,132 B2 * | 10/2020 | Bjorklund, Jr. | A01K 95/00 | |
| 11,641,849 B2 * | 5/2023 | Moe | A01K 85/16 | |
| | | | 43/42 | |
| 11,917,987 B2 * | 3/2024 | Parks | A01K 85/1833 | |
| 2001/0045048 A1 * | 11/2001 | Johnson | A01K 85/00 | |
| | | | 43/42.39 | |

(56)            References Cited

U.S. PATENT DOCUMENTS

| | | | |
|---|---|---|---|
| 2002/0095853 A1* | 7/2002 | Teegarden | A01K 83/06 |
| | | | 43/42.1 |
| 2006/0005459 A1* | 1/2006 | Lehman | A01K 83/06 |
| | | | 43/42.15 |
| 2006/0053680 A1* | 3/2006 | Petitjean | A01K 85/08 |
| | | | 43/42.47 |
| 2007/0107296 A1* | 5/2007 | Hollomon | A01K 85/01 |
| | | | 43/42.31 |
| 2008/0313948 A1* | 12/2008 | Lewis | A01K 85/00 |
| | | | 43/42.35 |
| 2009/0090040 A1* | 4/2009 | Kite | A01K 85/00 |
| | | | 43/43.1 |
| 2009/0100740 A1* | 4/2009 | Chan | A01K 85/16 |
| | | | 43/42.39 |
| 2009/0113783 A1* | 5/2009 | Hollomon | A01K 85/00 |
| | | | 43/44.8 |
| 2009/0126256 A1* | 5/2009 | Gregory | A01K 85/00 |
| | | | 43/42.15 |
| 2010/0071252 A1* | 3/2010 | Woodley | A01K 85/00 |
| | | | 43/42.35 |
| 2010/0162613 A1* | 7/2010 | Greene | A01K 85/00 |
| | | | 43/42.24 |
| 2011/0047856 A1* | 3/2011 | Gustafsson | A01K 85/16 |
| | | | 43/42.1 |
| 2012/0011762 A1* | 1/2012 | Magazzu | A01K 83/00 |
| | | | 43/44.8 |
| 2012/0079757 A1* | 4/2012 | Rye | A01K 85/01 |
| | | | 43/42.32 |
| 2013/0047490 A1* | 2/2013 | Gilmore | A01K 83/06 |
| | | | 43/42 |
| 2015/0047248 A1* | 2/2015 | Riddle | A01K 85/02 |
| | | | 43/43.1 |
| 2015/0250154 A1* | 9/2015 | Hamaguchi | A01K 91/08 |
| | | | 43/42.1 |
| 2017/0094958 A1* | 4/2017 | Steiginga | A01K 83/06 |
| 2023/0148577 A1* | 5/2023 | Nelson | A01K 85/1847 |
| | | | 43/17.6 |
| 2023/0301285 A1* | 9/2023 | Åström | A01K 85/1831 |

* cited by examiner

WEEDLESS LURES, HOOKS, AND CASTING LURES

CROSS-REFERENCE TO RELATED APPLICATIONS

This application is a continuation-in-part of co-pending U.S. patent application Ser. No. 18/469,200, filed Sep. 18, 2023, entitled "WEEDLESS LURES, HOOKS, AND CASTING LURES," which in turn claims the benefit of and priority to U.S. Provisional Application Ser. No. 63/408,934, entitled "WEEDLESS LURES, HOOKS, AND CASTING LURES," filed Sep. 22, 2022, the entirety of each of which is hereby incorporated herein by reference thereto.

FIELD OF DISCLOSURE

The present disclosure relates generally to fishing hooks and lures and, in particular, to casting lures, and to weedless and snagless fishing hooks and lures.

BACKGROUND

It is well-known that one of the problems with fishing in shallow waters or along the bottom of a body of water is the risk that the hook will become stuck in weeds. Among the solutions have been designing a guard 3, or protective structure, around a hook that is configured to avoid contact with weeds, as shown, for example, in FIG. 2B. Disadvantages of these types of lures include the difficulty in securely hooking the fish for successful retrieval, due to the pure geometry of these lures. Some lures include a latch 5, as shown in FIG. 2A, which may also be spring-loaded, for engaging the barbed end 7 of the hook to keep it out of the weeds. The barbed end disengages from the latch when the lure is struck by a fish. This design fails when the fish bites from a side angle, in which case, the guard does not release, and like the hood design, results in the fish not fully engaging the hook and likely the catch being lost before it can be retrieved. The other drawback of these designs is that any part of the wire hook, including the barbed end, can easily snag or pick up weed it touches or is dragged along the bottom of the body of water.

Accordingly, there is still a need for better performing weedless, as well as snagless, lures. There is also a need for improved casting lures, with or without weedless hooks or hook guards.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a weedless lure body for protecting a hook from snagging onto weeds and to lures including the weedless lure body operatively connected to lead weights. The weedless lure body and lures incorporating the weedless lure body are weedless and snagless.

The present disclosure is directed to embodiments of a weedless lure body, an improved lead weight for use with the weedless lure body or with any casting lure, hooks, and to weedless lures including the weedless lure body.

The present disclosure is also directed to a casting lure including a casting lure body with eel-like action. The casting lure of the present disclosure may be constructed with the casting lure body of the present disclosure together with any lead weight known in the prior art, or with the improved lead weight of the present disclosure.

The present disclosure is also directed to a weedless lure including a weedless lure body in the shape of a hollow elliptical cone and formed of rubber, wherein an open end of the hollow elliptical cone has an opening, in embodiments, that is an oblique opening angled either upward, in embodiments, or downward, in other embodiments, from a base of the hollow elliptical cone along a first side wall of the weedless lure body, wherein the base has an elliptical shape, and wherein the hollow elliptical cone further includes a second side wall, each of the first side wall and the second side wall positioned around opposing vertices of a major axis of the base. The weedless lure also includes a hook including a shank, which may be formed with grabbing barbs in embodiments, and a curved portion extending from the shank having a barbed end. The shank, in embodiments, via the grabbing barbs, is embedded in the second side wall of the hollow elliptical cone, and the weedless lure body is configured to collapse upon itself in use for retrieval, with a fish hooked onto the hook.

In other embodiments, the opening in the open end extends in a plane of the base from the first side wall to the second side wall.

The present disclosure is also directed to a casting lure including a casting lure body, which includes a flexible tubing housing. The flexible tubing housing includes an attachment end that is accessible externally to the plastic tubing housing for operatively attaching to a leader. The casting lure also includes a flexible braided wire encapsulated within the flexible tubing housing. The flexible braided wire includes a first end attached to an interior side of the attachment end within the flexible tubing housing; and a hook having a shaft and a barbed end, wherein a second end of the flexible braided wire is positioned below the first end, and is attached to a shank of the hook. The flexible tubing further includes a side opening through which the barbed end of the hook extends.

The present disclosure is also directed to a weedless lure including the weedless lure body of the present disclosure, and a lead weight, with the addition of latex rubber and/or shrink tubing to tag ends (knots) connecting the weedless lure body and/or hook(s) to the lead weight of the lure. The lead weight may be any lead weight known in the art, or the lead weight of the present disclosure.

The present disclosure is also directed to a casting lure including the casting lure body of the present disclosure, and a lead weight, with the addition of latex rubber and/or shrink tubing to tag ends (knots) connecting the weedless lure body and/or hook(s) to the lead weight of the lure. The lead weight may be any lead weight known in the art, or the lead weight of the present disclosure.

The present disclosure is also directed to weedless tackle including the weedless lure body of the present disclosure, a lead weight (known in the art or the innovative lead weight of the present disclosure), and latex rubber or shrink tubing covering tag ends of connections between components of the tackle. The weedless tackle may further include, in embodiments, a leader comprised of a 40 lb., 60 lb., or 80 lb. monofilament fishing line tied to the main fishing line.

The present disclosure is also directed to a weedless lure, which includes a weedless lure body in the shape of a hollow elliptical cone and formed of a deformable material; and a hook including a shank, a curved portion extending downward from the shank, and a barbed end, the curved portion terminating in the barbed end, which is configured to hook a fish in use. The hook further includes an attachment end portion operatively connected to a top of the shank, and extending externally to the weedless lure body and is accessible externally to the weedless lure body. The hollow elliptical cone has an open end, the open end with an opening in a shape of an ellipse, the hollow elliptical cone including a first side wall and a second side wall extending downward from a top of the hollow elliptical cone. The curved portion of the hook. In embodiments, extends below the weedless lure body, and the barbed end is curved upward and positioned transversely within the opening, and vertically below the open end of, and uncovered by, the hollow elliptical cone, such that all sides of the barbed end of the hook are exposed for access by a fish in use, and wherein the shank is embedded within the second side wall of the hollow elliptical cone of the weedless lure body, such that the barbed end extending therefrom is fixed relative to the second side wall, transversely within the opening, and vertically below the open end of the weedless lure body in use.

In embodiments, the attachment end portion that protrudes through the aperture is a ring.

In further embodiments, the weedless lure body includes a tail that extends downward from the second side wall below the open end.

In embodiments, the attachment end portion may protrude through an aperture in the top of the hollow elliptical cone forming the weedless lure body.

The shank may include barbs along opposing sides of the shank to facilitate embedding the shank, via the barbs, in the second side wall of the hollow elliptical cone.

The weedless lure body is preferably configured to collapse upon itself in use for retrieval, with a fish caught on the barbed end of the hook.

In embodiments, the weedless lure further includes a swivel, and a weight, the weight including a lower end operatively attached via the swivel to the attachment end portion that protrudes through the aperture, and an upper end configured, in use, for attaching a leader thereto.

The weight may be a flat, wavy, body, the weight having a longitudinal axis defined between the upper end and the lower end of the weight, wherein the weight has a wavy profile in cross-section along the longitudinal axis, and has a flat profile in a cross-section along a transverse axis.

An entire length of the weight along the longitudinal axis, in embodiments, is at least three times greater than a central width of the weight transverse to the longitudinal axis, and a thickness of the weight is less than the central width.

In further embodiments, the upper end of the weight includes an upper eyelet configured in use for attaching the leader thereto, and the lower end includes a lower eyelet configured for operatively attaching to the swivel, wherein the weight is tapered along the transverse axis at each of the upper end and the lower end.

The weedless lure of the disclosure may be formed of a rubber, in embodiments, a type of rubber that is pourable.

In embodiments, the opening of the open end is formed as an oblique opening angled downward from a base of the hollow elliptical cone from the second side wall and intersecting the first side wall of the weedless lure body.

In other embodiments, the opening of the open end is formed as an oblique opening angled upward from the base of the hollow elliptical cone from the second side wall and intersecting the first side wall of the weedless lure body.

In still other embodiments, the opening of the open end extends along a base of the hollow elliptical cone from the second side wall to the first side wall of the weedless lure body.

The present disclosure is also directed to casting lure, which includes a tubular housing, a braided wire encapsulated within the tubular housing, and a hook including a shank and a curved portion extending downward from the shank and terminating in a barbed end configured to hook a fish in use. The tubular housing includes an attachment end portion having an exterior element accessible externally to the tubular housing and configured for operatively attaching to a leader and an interior element extending downward from the exterior element and encapsulated within the tubular housing. The braided wire has a first end and a second end positioned below the first end, wherein the first end is attached to the interior element of the attachment end portion. Each of the first end and the second end is positioned within the tubular housing. The tubular housing includes an open end, wherein the curved portion of the hook extends downward through the open end, and the second end of the braided wire is attached within the tubular housing to the shank of the hook.

In embodiments, the casting lure includes an added hook located between the attachment end portion and the hook that extends downward through the open end. The added hook includes a shank attached to a middle portion of the braided wire between the first end and the second end and a curved portion extending from the shank of the added hook, the added hook terminating in a barbed end configured to hook a fish in use. The tubular housing further includes a side opening through which the barbed end of the added hook extends.

The tubular housing is preferably formed of a flexible and stretchable material, which may be, in embodiments, one of a plastic and rubber material, and in further embodiments, may be surgical tubing.

Embodiments of the casting lure may further include a tail extending downward from the tubular housing below the open end, wherein the tail includes at least two longitudinal strands extending downward below the open end. The tubular housing includes at least one longitudinal slit below the open end to form the at least two longitudinal strands.

In further embodiments, the casting lure includes a knotted connection with a tag end connecting: the first end of the braided wire to the interior element of the attachment end portion; the second end of the braided wire to the shank of the hook; and the middle portion of the braided wire to the added hook. Each of the knotted connections with the tag end is encapsulated within the tubular housing.

The casting lure, in embodiments, further includes a swivel, and a weight having an upper end and a lower end, wherein the lower end of the weight is operatively attached via the swivel to the external element of the attachment end portion, and the upper end is configured, in use, for attaching a leader thereto.

The weight, in embodiments, is a flat, wavy, body, the weight having a longitudinal axis defined between the upper end and the lower end, wherein the weight has a wavy profile in cross-section along the longitudinal axis, a flat profile in a cross-section along a transverse axis, a length along the longitudinal axis that is at least three times greater than a central width of the weight transverse to the longitudinal axis, and a thickness that is less than the width. A width of the weight is tapered at each of the upper end and the lower end.

The upper end of the weight of embodiments of the casting lure may include an eyelet configured for attaching the leader thereto, and the lower end of the weight may include a lower eyelet configured for operatively attaching to the swivel.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

Figure 1:
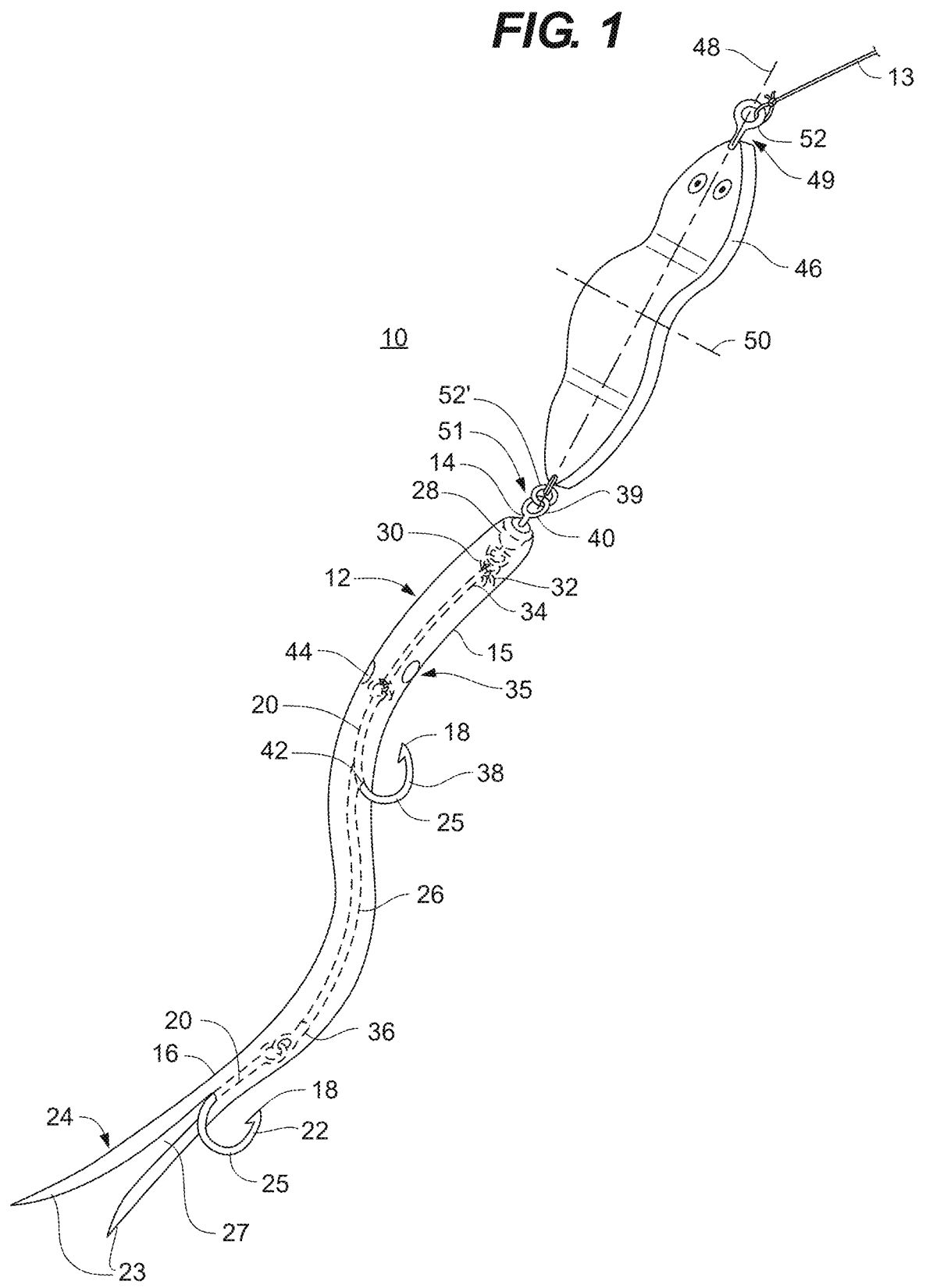
FIG. 1 is a pictorial representation of an embodiment of a casting lure of the present disclosure.
Figures 2A, 2B:
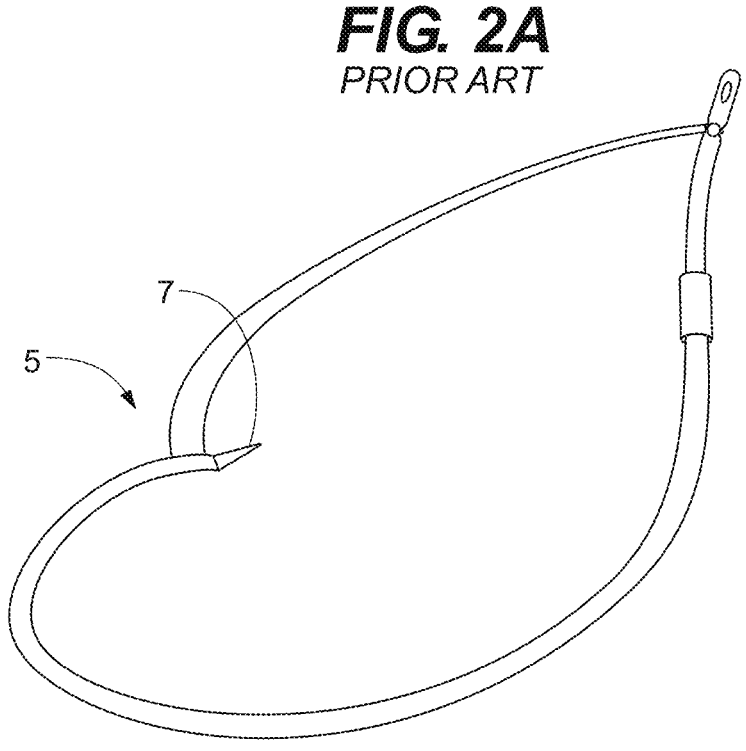
FIGS. 2A and 2B are pictorial representations of prior art weedless hooks.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure of weedless lures, weedless lure bodies, hooks, lead weights, and weedless tackle, as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

The present disclosure is directed to a weight for a fishing lure. The present disclosure is also directed to a casting lure including a casting lure body. The present disclosure is further directed to a weedless lure including a weedless lure body. The present disclosure is also directed to casting lures with the casting lure body of the present disclosure, and weedless lures with the weedless lure body of the present disclosure, each of which also include embodiments of the weight of the present disclosure.

Referring to FIG. 1, an embodiment of a casting lure body 12 of the present disclosure includes an attachment end portion 14, which includes an external element 39 that is accessible externally to the casting lure body 12 and configured, in use, for operatively attaching to a leader 13, and an open end 16 that is longitudinally opposite the attachment end portion 14. The external element 39 may be, in embodiments, a ring, eyelet, or other suitable attaching element. A casting lure 10 includes the casting lure body 12, and a hook 22, which includes a shank 20, and a curved portion 25 extending downward from the shank 20 and terminating in a barbed end 18 configured to hook a fish in use. The curved portion 25 of the shank 20 extends downward through the open end 16. The casting lure body 12 may also include a tail 24 extending downward from the casting lure body 12 below the open end 16. In embodiments, the tail 24 includes at least two longitudinal strands 23 extending downward below the open end 16, which are formed by providing at least one longitudinal slit 27 in the tubular housing 15 below the open end 16.

The casting lure body 12, in embodiments, includes a tubular housing 15, which is preferably formed of a flexible, and preferably stretchable, tubing, formed of plastic or rubber, for example. In the embodiment shown in FIG. 1, for example, the tubular housing 15 is formed from surgical tubing, but may alternatively be formed of other similar flexible, and preferably, stretchable, tubing construction, configured so that the casting lure body 12 serves as an attractant to fish by virtue of its wiggling movement through the water, easily slides along the water, and bounces off of obstacles in its path in use.

The casting lure body 12 also preferably includes braided wire 26, which is preferably flexible, encapsulated within the tubular housing 15. The flexible, braided wire 26 includes a first end 34 connected to an interior element 28 of the attachment end portion 14, wherein the interior element extends downward from the exterior element and is encapsulated within the tubular housing. The braided wire 26 also includes a second end 36 positioned below the first end 34 and within the tubular housing 15, which is operably connected to the shank 20 of the hook 22. Accordingly, a knotted connection 30 with tag end 32 connecting the first end 34 of the flexible, braided wire 26 to the attachment end portion 14 and another knotted connection 30 with tag end 32 connecting the second end 36 to the shank 20 of the hook 22 are both encapsulated within the tubular housing 15 of the casting lure body 12. This prevents the problem that exists in prior art designs of tag ends formed at the connection point of various adjacent component parts of the lure from snagging, and also enhances the eel-like, smooth action of the casting lure through the water.

Another advantage of the casting lure body 12 of FIG. 1 over the prior art is that the shank 20 of the hook 22, which is normally characterized in the prior art as having a stiff, rigid construction (typically, a solid, thick metal core wire), is not connected directly to a weight 46 or leader 13. These prior art designs only allow pivoting and rotation (via a swivel connection) at the connection between the hook and the lead weight, for example. In contrast, by connecting a length of braided, flexible wire 26 between the stiffly constructed shank 20 of the hook 22 and the attachment end portion 14, which may be connected, in embodiments, to a swivel 40, the casting lure body 12, and the hook(s) 22, 38 attached thereto, not only rotates and pivots, but may also flex in any direction, in a wiggling motion. The movement and appearance in the water of the casting lure body 12 thus resembles that of an eel.

Still referring to FIG. 1, the casting lure 10 may include only a single hook, e.g., the hook 22 extending from the open end 16. In other embodiments, as shown, the casting lure 10 may also include one or more additional hooks, for example, added hook 38 located between hook 22 and the attachment end portion 14, which also includes shank 20 and the curved portion 25 extending from the shank 20 of the added hook 38, which terminates in the barbed end 18. The shank 20 of each of the one or more added hooks 38 is attached to a middle portion 35 of the braided, flexible wire 26 between the first end 34 and the second end 36 of the braided, flexible wire 26, such that each knotted connection 30 and tag end 32 connecting each shank 20 to the braided, flexible wire 26 is encapsulated within the tubular housing 15 of the casting lure 10.

In embodiments having a hook located above the open end 16, as shown in FIG. 1, the casting lure body 12 also includes a side opening 42 through which the barbed end 18 of the added hook 38 protrudes. In addition, the casting lure body 12 of such embodiments also preferably includes an aperture 44 adjacent the end of the shank 20 of the hook 38 so that the hook 38 may be connected via the knotted connection 30 to the flexible, braided wire 26.

Still referring to FIG. 1, embodiments of a casting lure 10 of the present disclosure include the casting lure body 12 as shown and described, a weight 46, which is, in embodiments, a weight 46, and a swivel 40 operatively connecting the attachment end portion 14 to the weight 46.

Figures 7A, 7B, 7C:
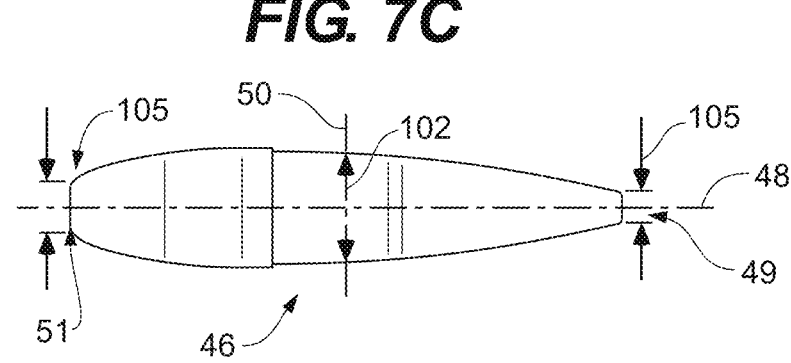
FIG. 7A is a pictorial representation of a cross-section along a longitudinal axis through an embodiment of a weight shown in FIG. 1 of the present disclosure.
FIG. 7B is a pictorial representation of a cross-section along a transverse axis, centrally located along a length of the weight in FIG. 7A, through the weight shown in FIG. 1.
FIG. 7C is a pictorial representation of a top view of the weight of FIG. 1.

The weight 46, in embodiments, is wavy along its longitudinal axis 48, having a wavy profile 45 in cross-section along the longitudinal axis 48, as shown in FIG. 7A, and is substantially flat along a transverse axis 50, having a flat profile 47 in cross-section along the transverse axis 50, as shown in FIG. 7B. In embodiments, the weight 46 further includes an eyelet 52, also referred to herein as a ring 52, for attaching to a leader 13. In embodiments, as shown, for example, in FIG. 1, the weight 46 has an upper end 49 configured in use for attaching to the leader 13, and a lower end 51 configured in use for operatively attaching to the swivel 40, in embodiments, via the external element 39 of the attachment end portion 14, wherein the longitudinal axis 48 is defined between the upper end 49 and the lower end 51 of the weight 46. In embodiments, each of the upper 49 and lower end 51 includes an upper 52 and lower eyelet 52' respectively.

Still referring to FIGS. 7A, 7B, and also to FIG. 7C, in further embodiments of the weight 46 of the present disclosure, an entire length 100 along the longitudinal axis 48 is at least three times greater than a central width 102, measured at a center of the entire length 100 of the weight 48, transverse to the longitudinal axis 48, and a thickness 104 over the entire length 100 that is less than the central width 102. In further embodiments, a width 105 of the weight 46 along the transverse axis 50 is tapered at each of the upper end 49 and the lower end 51 of the weight 46.

Figure 3A:
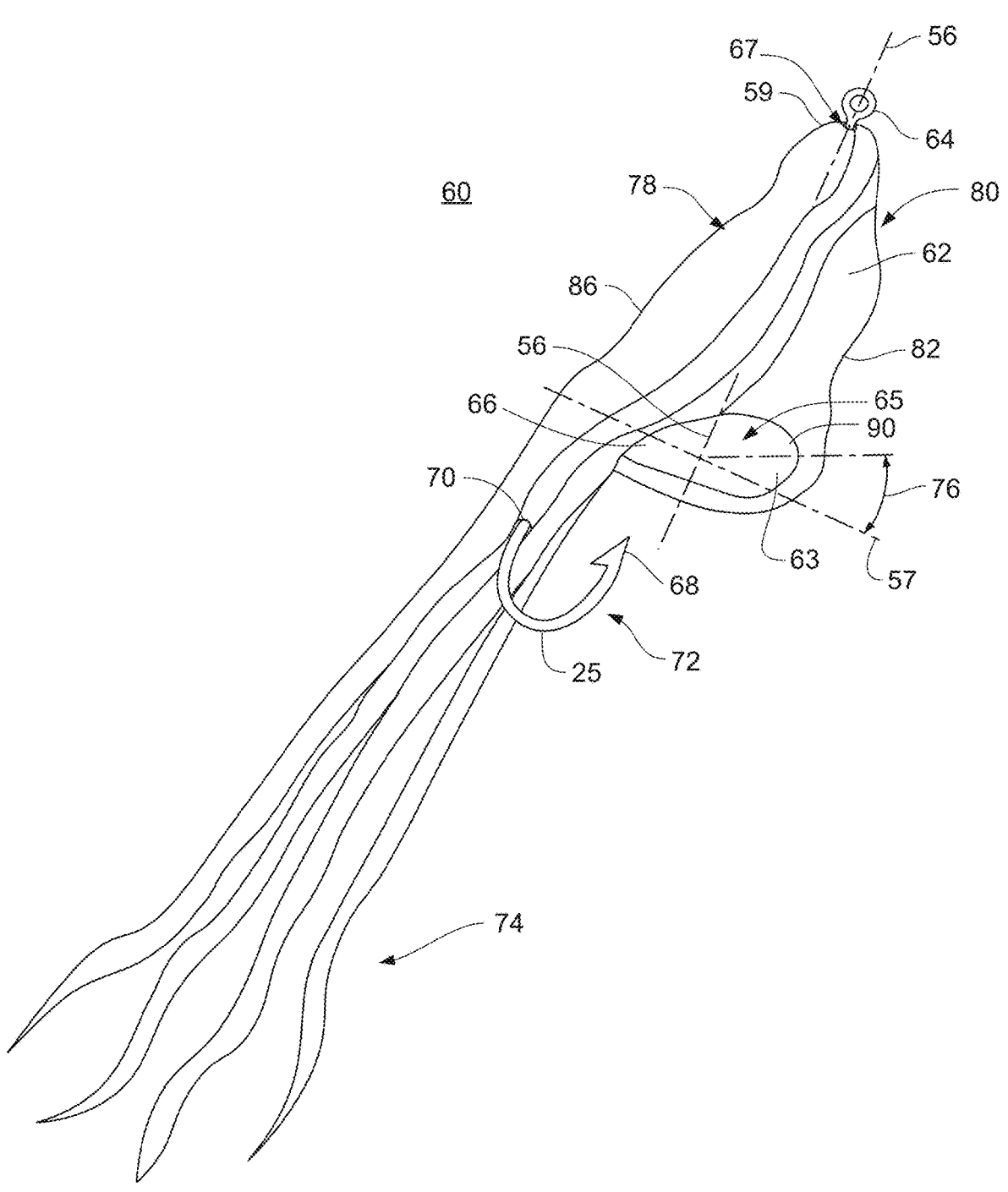
FIG. 3A is a pictorial representation of an embodiment of a weedless lure body of the present disclosure.

Referring to FIGS. 3A-5, embodiments of a weedless lure body 60 of the present disclosure are preferably formed of a deformable material, which is preferably flexible and stretchable. In embodiments, the deformable material is a flexible and stretchable rubber or plastic material. Referring to FIGS. 3A-3C, the weedless lure body 60 includes an open end 66 from which a barbed end 68 of a hook 72 extends from a curved portion 73 of a shank 70 of the hook 72. The weedless lure body 60 may also include a tail 74 extending from the casting lure body 12 below the open end 66.

Figure 3B:
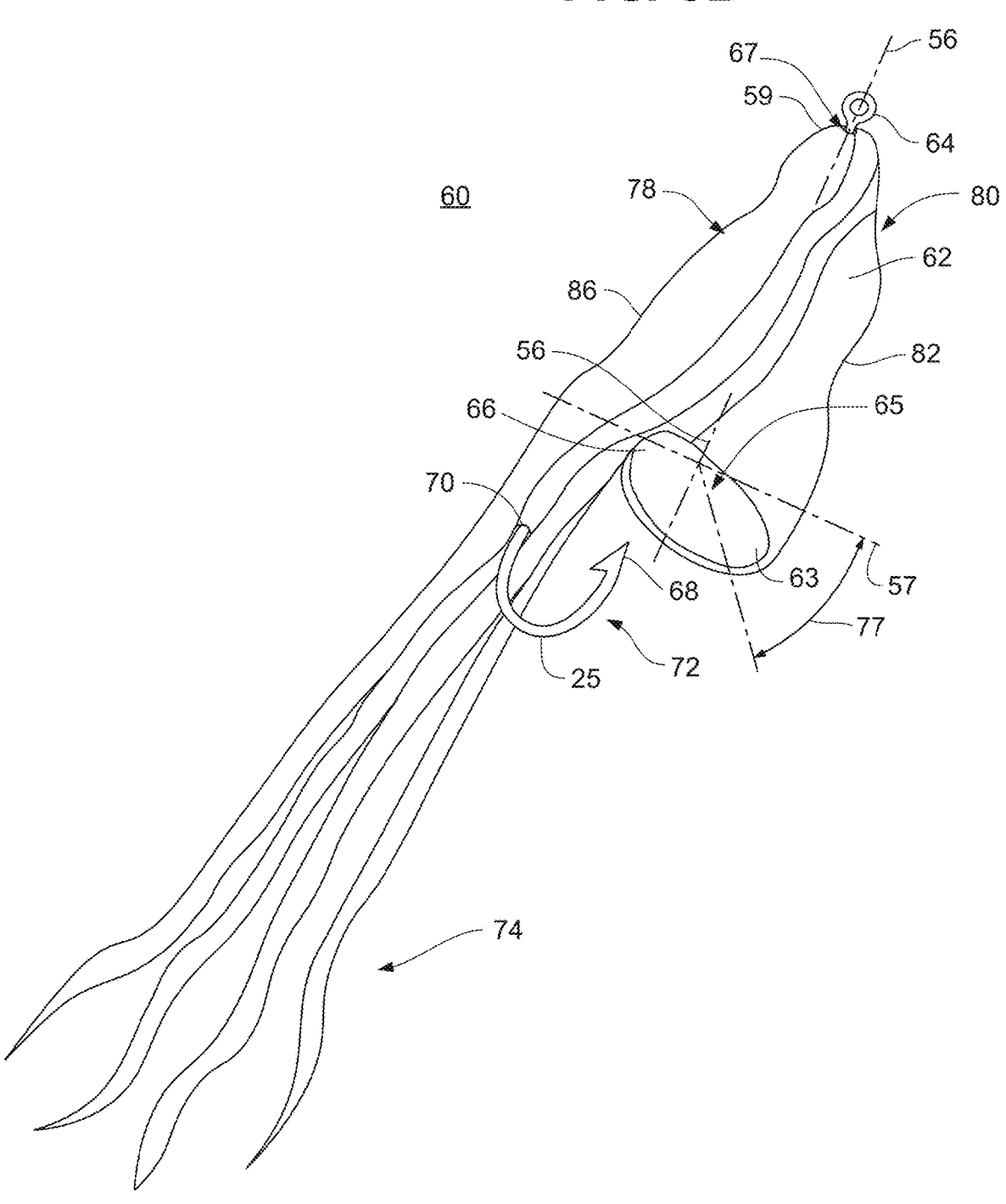
FIG. 3B is a pictorial representation of another embodiment of a weedless lure body of the present disclosure.
Figure 6A:
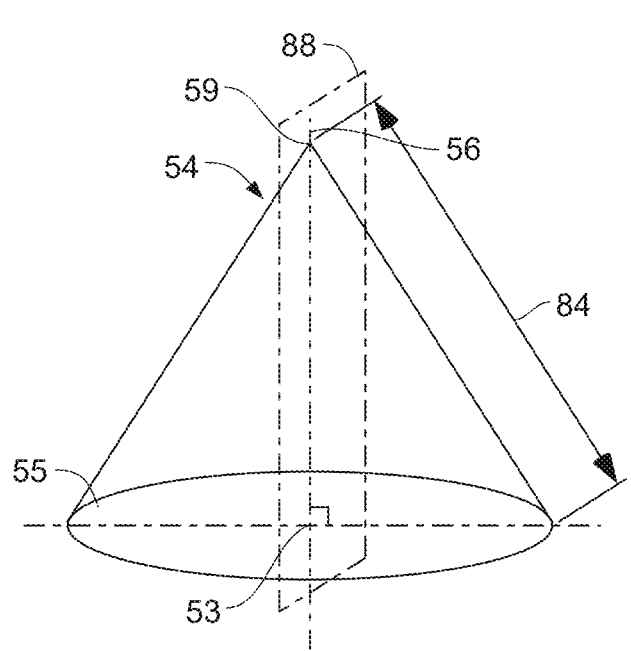
FIG. 6A is a pictorial representation of a cone with an elliptical base for reference.
Figure 6B:
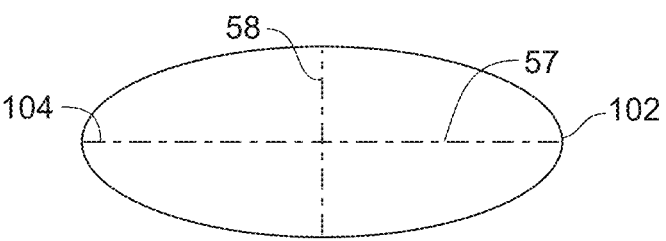
FIG. 6B is a pictorial representation of the elliptical base of the cone of FIG. 6A.

The weedless lure body 60 of FIGS. 3A-3C and 4B is, in embodiments, in the shape of a hollow elliptical cone 62 wherein an opening 63 in the open end 66 is formed, in embodiments, as an oblique opening 65 cut at an oblique angle 76 to and upward from (FIG. 3A), a major axis 57 of a base 55 of a right elliptical cone 54 (see FIGS. 6A, 6B), or, in embodiments, the oblique opening 65 is cut at an oblique angle 77 downward from (FIG. 3B) the major axis 57 of the base 55 of the right elliptical cone 54 (see FIGS. 6A, 6B), the geometry of which is modified as described herein, in embodiments shown in FIG. 3A, 3B, to form the hollow, oblique cone 62. FIGS. 6A and 6B are provided to facilitate an understanding of the geometry of embodiments of the weedless lure body 60. The right elliptical cone 54 includes the base 55, shown in FIG. 6B, which is an ellipse, having the major (longer diameter) axis 57 and a minor (shorter diameter) axis 58. The base 55 is perpendicular to a longitudinal axis 56 that extends from an apex 59 of the right elliptical cone 54 through a center 53 of the base 55.

In other embodiments, referring to FIG. 3B, the opening 63 in the open end 66 is formed in a plane of the base 55 of the right elliptical cone 54, i.e., the opening 63 is formed at a perpendicular angle 79 to the longitudinal axis 56.

Referring again to FIGS. 3A-3C and 4B, the weedless lure body 60 is in the form of a hollow elliptical cone 62 having an apex 59 that is rounded, wherein a longitudinal plane 88 extending along the longitudinal axis 56 from the apex 59 through the base 55 (see FIGS. 6A, 6B), and along the minor axis 58 of the base 55 of the hollow elliptical cone 62, defines a first side portion 80 including a first side wall 82, and a second side portion 78 including a second side wall 86 opposing the first side wall 82, on either side of the longitudinal plane 88. In embodiments, the open end 66 provides the opening 63 as an oblique opening 65 that extends upward (FIG. 3A), or, in embodiments, extends downward, from the second side wall 86 to intersect the first side wall 82 of the first side portion 80, the first side wall 82 being opposite the second side wall 86, at a distance from the base 55 that is at least half of a slant height 84 higher or lower, respectively, than a location of the base 55 of the hollow elliptical cone 62 (see FIG. 6A). In further embodiments, as shown in FIG. 3A, 3B, the oblique opening 65 extends between one-half to three-quarters of the slant height 84 of the first side wall 82, higher, or lower, respectively, than the location of the base 55. The second side wall 86 of the hollow elliptical cone 62 forming the weedless lure body 62 extends a full length of the slant height 84 from the base 55 to the apex 59, in embodiments. With reference to FIG. 6A, the first side wall 82 is positioned opposite the second side wall 86, around opposing vertices 102, 104, respectively, of the major axis 57 of the base 55.

Figure 3C:
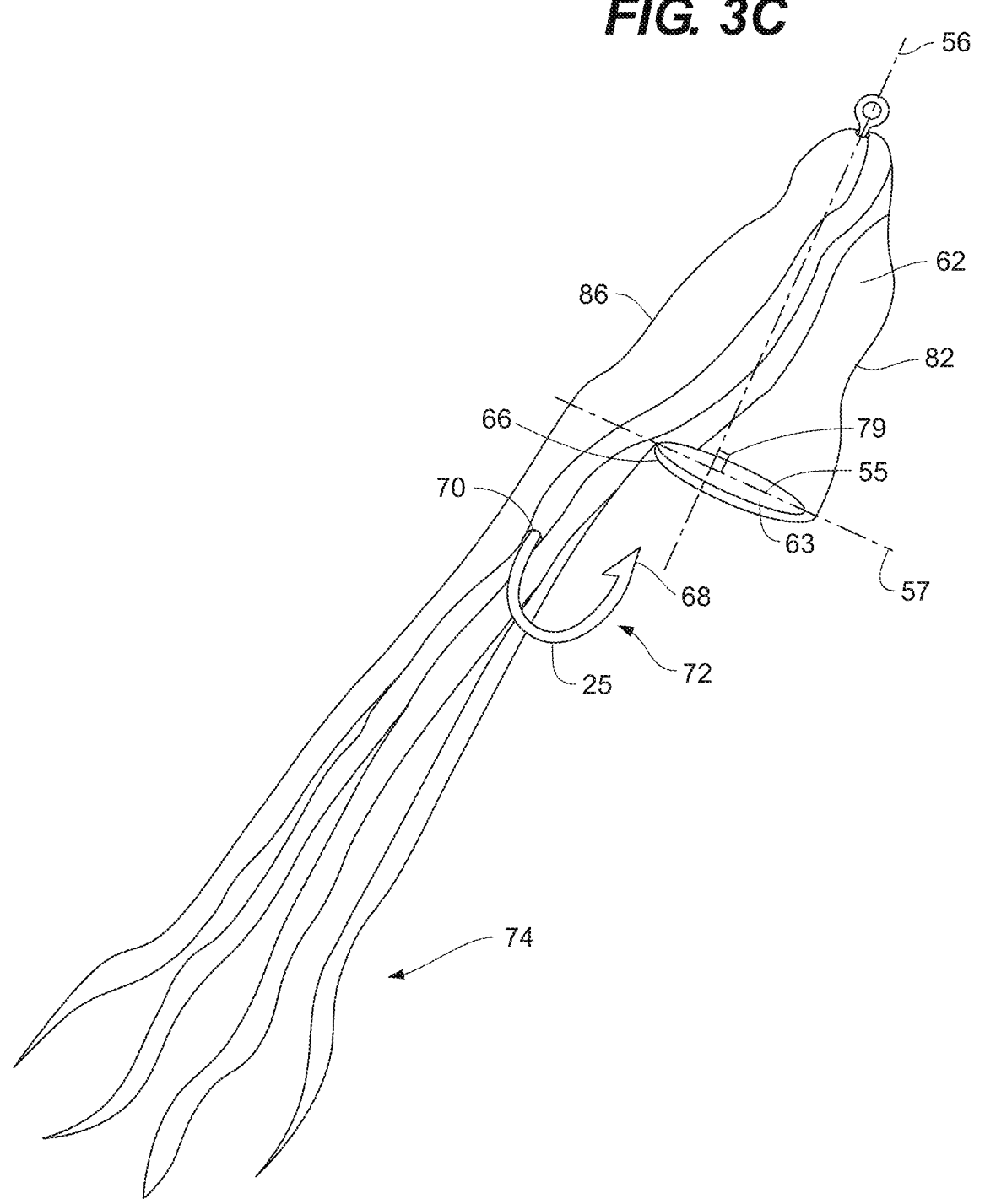
FIG. 3C is a pictorial representation of yet another embodiment of a weedless lure body of the present disclosure.

In further embodiments, as shown in FIG. 3C, the opening 63 is perpendicular to the longitudinal axis 56, and both the first side wall 82 and the second side wall 46 intersect the base 55 at the same height.

In embodiments, the tail 74 of the weedless lure body 60 preferably extends downward from the second side wall 86 below the open end 66.

Figures 4A, 4B:
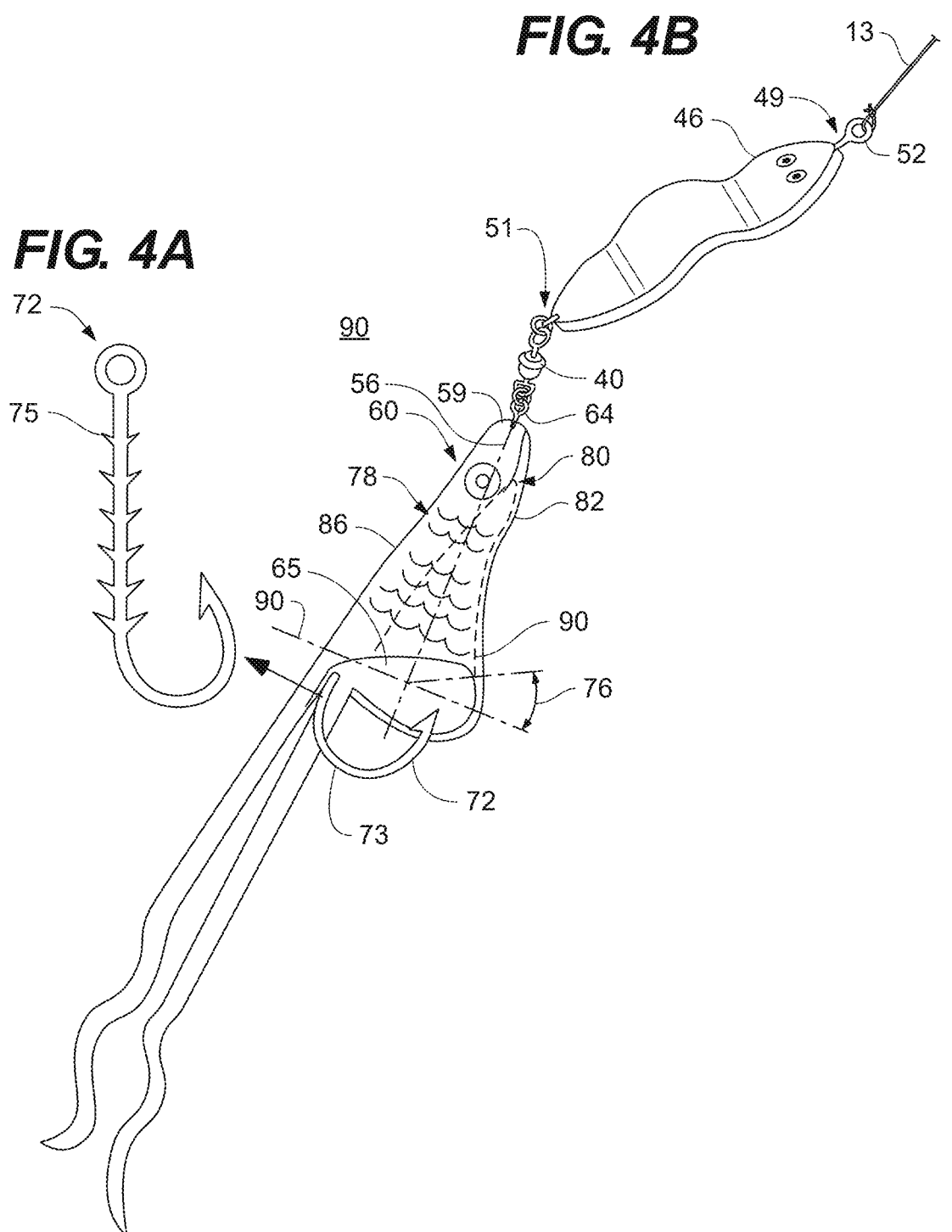
FIG. 4A is a pictorial representation of an embodiment of a hook that is embedded in the weedless lure of FIG. 4B.
FIG. 4B is a pictorial representation of an embodiment of a weedless lure of the present disclosure including the weedless lure body of FIG. 3A.
Figure 5:
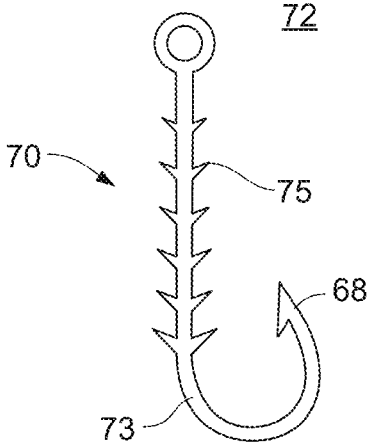
FIG. 5 is a pictorial representation of an embodiment of a hook which may be included in any of the weedless lure bodies of FIGS. 3A, 3B, 3C.

Referring to FIGS. 3A, 3B, and 4B, in embodiments, the shape of the oblique opening 65 in the plane of the angle 76, 77 from the intersection of the base 55 with the second side 86 to a rounded end 90 along the first side 82, may be elliptical, resulting from a straight cut through the elliptical cone 54 at the angle 76, 77. Likewise, referring to FIG. 3C, in embodiments in which the opening 63 is in the plane of the base 55, the opening 63 may also be elliptical. In other embodiments, the oblique opening 65 may be further widened transversely, i.e., in a direction transverse to the longitudinal axis 56 that is, along the minor axis 58 or major axis 57 defined by the base 55 (see FIG. 6B).

Although the oblique opening 65, in embodiments, may appear to extend only a short distance above (FIG. 3A) or below (FIG. 3B) the major axis 57 of the base 55, in preferred embodiments, the angle of the oblique cut preferably ends at least three-quarters along the slant height 84 of the first side 82, with additional widening in the direction transverse to (e.g., along the minor axis 58) the longitudinal axis 56.

The shape of the opening 63, and in embodiments, the oblique opening 65, may be configured such that the weedless lure body 60 is hood-shaped.

Referring to FIG. 4B, a weedless lure 90 of the present disclosure includes the weedless body 60 and the hook 72, which includes the shank 70, the curved portion 73 extending downward from the shank 70 and terminating in the barbed end 68 configured to hook a fish in use, and an attachment end portion 64 operatively connected to a top of the shank 70. Referring to FIGS. 3A-3C, for example, the attachment end portion 64 protrudes through an aperture 67 in a top of the weedless lure body 60 and is accessible externally to the weedless lure body. The curved portion 73 extends below the hollow elliptical cone 62, and the barbed end 68 is curved upward and positioned transversely within the opening 63, or in embodiments, the oblique opening 65, and vertically below the open end 66 of, and uncovered by, the hollow elliptical cone 62.

In embodiments, the attachment end portion 64 that protrudes through the top of the weedless lure body 60 is a ring or an eyelet.

The weedless lure body 60, as shown and described, allows the fish to bite successfully and securely from all sides of the hook 72. Once the fish is secured, due to its unique geometry and deformable material, the weedless lure body 60 collapses on itself, in use, for retrieval, protecting the hook 72, with the fish caught on its barbed end, from getting snagged in the weeds, and forming a solid body of rubber that easily bounces off of rocks and the sea, lake, or stream bottom, as the catch is reeled on.

Referring to FIGS. 4A and 5, and FIGS. 3A-3C, in embodiments, the weedless lure 90 shown in FIGS. 3A-3C and 4B may further include a unique hook design. Unlike conventional hook guards having a body with the shank of the hook extending freely through its center, the embodiments of the hook 72 of the weedless lure 90 of the present disclosure is embedded in the second side wall 86 of the second side portion. The shank 70 of the hook 72 may include, in embodiments, a plurality of grabbing barbs 75 along opposing sides of the shank 70 that are embedded within the second side wall 86 along the slant height 84 of the weedless lure body 60.

In embodiments, the weedless lure body 60 is formed of a deformable material. In embodiments, the deformable material is molded rubber or plastic, and in embodiments, is a pourable rubber, such as a latex pourable rubber, which is poured around the shank 70 and the grabbing barbs 75 of the hook 72, into a mold, in the manufacturing process.

This unique design of the hook 72 and manufacture of the weedless lure body 60 with the shank 70 of the hook 72 molded into the second side wall 86 prevents the hook 72 from disengaging from the weedless lure body 60 when reeling in a fish, and maintains the barbed end 68 extending from the shank 70 fixed relative to the second wall 86, transversely within the opening 63, including oblique opening 65, in embodiments, and vertically below the open end 66 of the weedless lure body 60 even in use.

Referring to FIG. 4B, embodiments of the weedless lure 90 of the present disclosure may also include any of the embodiments of the weight 46 (see FIG. 1, for example) of the present disclosure, and a swivel 40. In embodiments, the lower end 51 of the weight 46 is operatively attached via the swivel 40 to the attachment end portion 64 of the hook 72 that protrudes through the aperture 67 of the weedless body 60. The upper end 49 of the weight 46 is configured, in use, for attaching the leader 13 thereto. The weight 46 may further include the eyelet 52 for attaching to the leader 13, and in embodiments includes the upper 52 and the lower eyelet 52' as described in reference to FIG. 1.

The weedless lure body of the present disclosure has been tested for several hundred hours of use, both on shore and off shore, in seaweed-laden bodies of water, with no failures. The weedless success is attributed primarily to the design of the weedless lure body itself. The performance of the weedless lure of the present disclosure, which includes the weedless lure body and any prior art lead weight, or the innovative lead weight of the present disclosure, may also be enhanced by the addition of latex rubber and/or shrink tubing to tag ends (knots) connecting the weedless lure body and/or hook(s) to a lead weight of the lures.

Weedless tackle is also considered within the scope of the present disclosure. The weedless tackle includes any the weedless lure body of the present disclosure, a lead weight (known in the art or the innovative lead weight of the present disclosure), and, preferably, latex rubber or shrink tubing covering tag ends of connections between components of the tackle. The weedless tackle may further include, in embodiments, a leader comprised of a 40 lb., 60 lb., or 80 lb. monofilament fishing line tied to the main fishing line. The weedless tackle of the present disclosure is of heavy duty construction suitable for larger predatory fish, including, but not limited to, blues, bass and tuna.

It is believed that there is no known weedless hook or lure that can achieve these results.

While particular embodiments of the present disclosure have been particularly shown and described with reference to specific embodiments, it should be apparent to those skilled in the art that the foregoing is illustrative only and not limiting, having been presented by way of example only. It is to be understood that the disclosed embodiments are merely examples of the disclosure, which may be embodied in various forms and detail without departing from the spirit and scope of the disclosure. Therefore, specific structural and functional details disclosed herein are not to be interpreted as limiting. Numerous other embodiments may fall within the scope of the accompanying claims and equivalents thereto.

What is claimed is:

1. A weedless lure, comprising:

a weedless lure body in the shape of a hollow elliptical cone and formed of a deformable material, wherein the hollow elliptical cone includes an open end with an opening in a shape of an ellipse, the hollow elliptical cone including a first side wall and a second side wall opposite the first side wall extending downward from a top of the hollow elliptical cone to the open end; and a hook including a shank, a curved portion extending downward from the shank, and a barbed end, the curved portion terminating in the barbed end and configured to hook a fish in use, and an attachment end portion operatively connected to a top of the shank, and extending externally to the weedless lure body, wherein the curved portion of the hook extends below the weedless lure body, and the barbed end is curved upward and is positioned transversely within the opening, and vertically below the open end of, and uncovered by, the hollow elliptical cone, such that all sides of the barbed end of the hook are exposed for access by a fish in use, and wherein the shank is embedded within the second side wall of the hollow elliptical cone of the weedless lure body, such that the barbed end extending therefrom is fixed relative to the second side wall, transversely within the opening, and vertically below the open end of the weedless lure body in use.

2. The weedless lure of claim 1, wherein the weedless lure body includes a tail that extends downward from the second side wall below the open end.

3. The weedless lure of claim 1, wherein the shank includes barbs along opposing sides of the shank, and is embedded, via the barbs on its opposing sides, in the second side wall of the hollow elliptical cone, and wherein the weedless lure body is configured to collapse upon itself in use for retrieval, with a fish caught on the barbed end of the hook.

4. The weedless lure of claim 1, wherein the deformable material is a rubber.

5. The weedless lure of claim 1, wherein the opening of the open end is formed as an oblique opening angled downward from a base of the hollow elliptical cone from the second side wall and intersecting the first side wall of the weedless lure body.

6. The weedless lure of claim 1, wherein the opening of the open end extends along a base of the hollow elliptical cone from the second side wall to the first side wall of the weedless lure body.

7. The weedless lure of claim 1, wherein the attachment end portion protrudes through an aperture in the top of the hollow elliptical cone forming the weedless lure body.

8. The weedless lure of claim 7, wherein the attachment end portion that protrudes through the aperture is a ring.

9. The weedless lure of claim 7, further including a swivel, and a weight, the weight including a lower end operatively attached via the swivel to the attachment end portion that protrudes through the aperture in the top of the hollow elliptical cone, and an upper end configured, in use, for attaching a leader thereto.

10. The weedless lure of claim 9, wherein the weight is a flat, wavy, body, the weight having a longitudinal axis defined between the upper end and the lower end of the weight, wherein the weight has a wavy profile in cross-section along the longitudinal axis, and has a flat profile in a cross-section along a transverse axis.

11. The weedless lure of claim 10, wherein an entire length of the weight along the longitudinal axis is at least three times greater than a central width of the weight transverse to the longitudinal axis at a center of the entire length, and wherein a thickness of the weight along the entire length is less than the central width.

12. The weedless lure of claim 10, wherein the upper end of the weight includes an upper eyelet configured in use for attaching the leader thereto, and the lower end includes a lower eyelet configured for operatively attaching to the swivel, and wherein the weight is tapered along the transverse axis at each of the upper end and the lower end.

* * * * *